Figure 1:
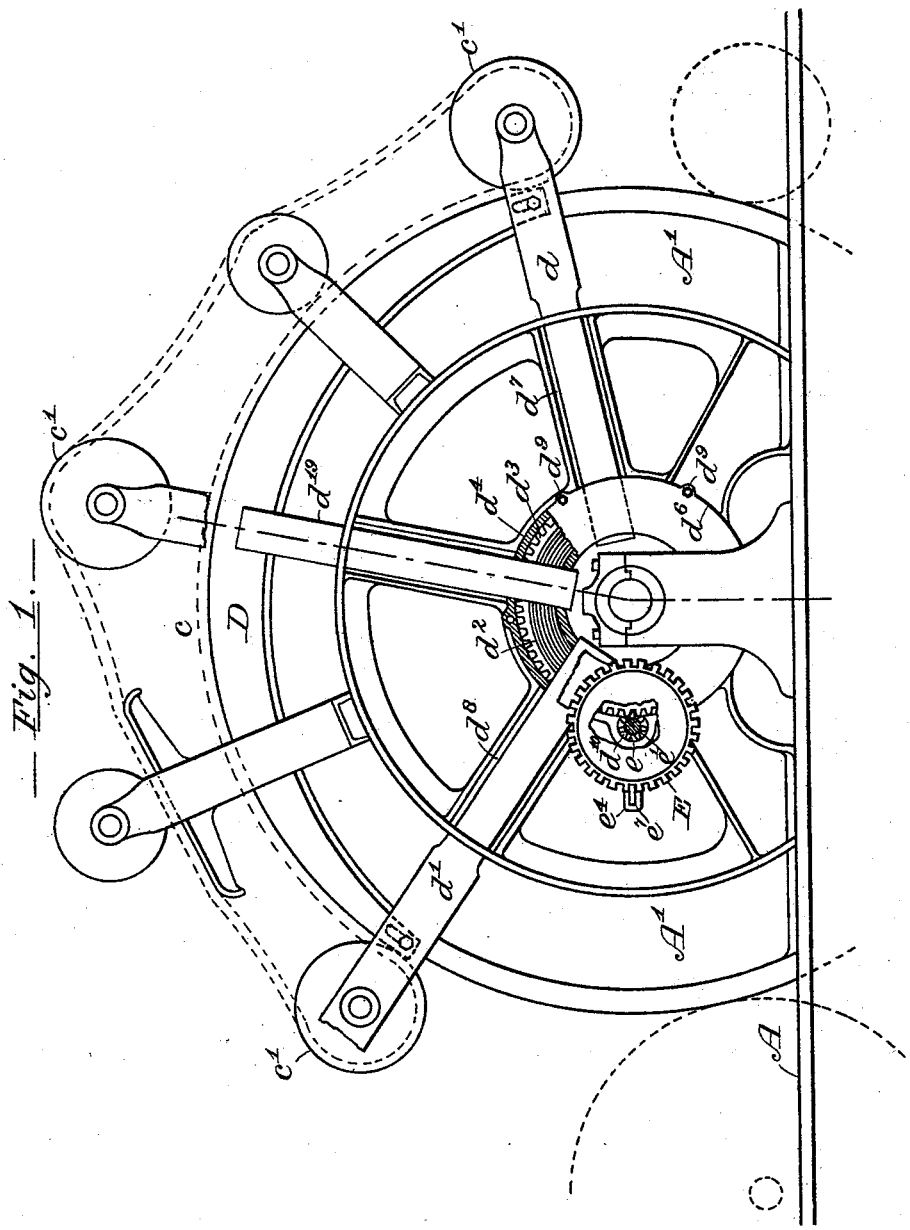

(No Model.)  4 Sheets—Sheet 1.

C. L. HILDRETH.
CARDING ENGINE.

No. 457,319. Patented Aug. 4, 1891.

WITNESSES.  INVENTOR.

(No Model.)　　　　　C. L. HILDRETH.　　　4 Sheets—Sheet 2.
CARDING ENGINE.
No. 457,319.　　　　　　　　　Patented Aug. 4, 1891.
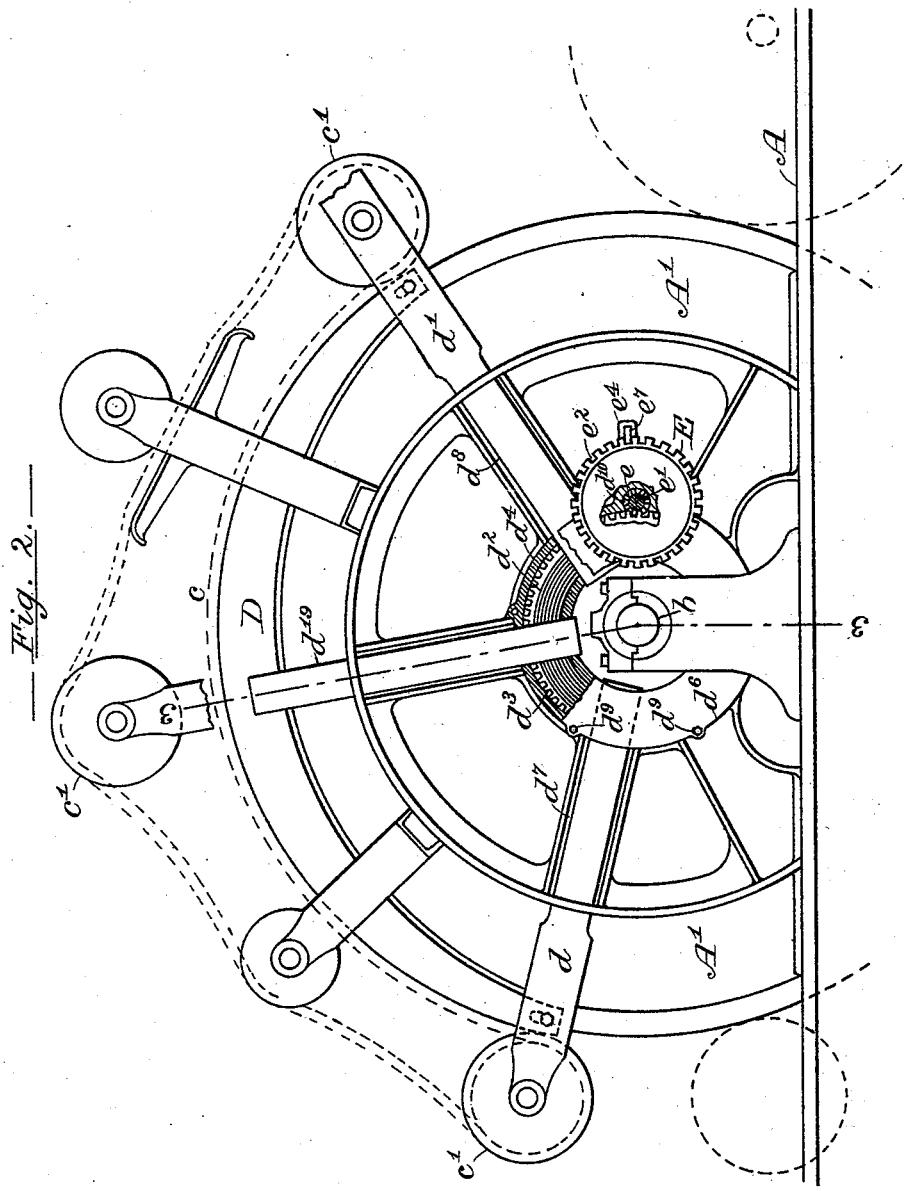
WITNESSES.　　　　　　　INVENTOR

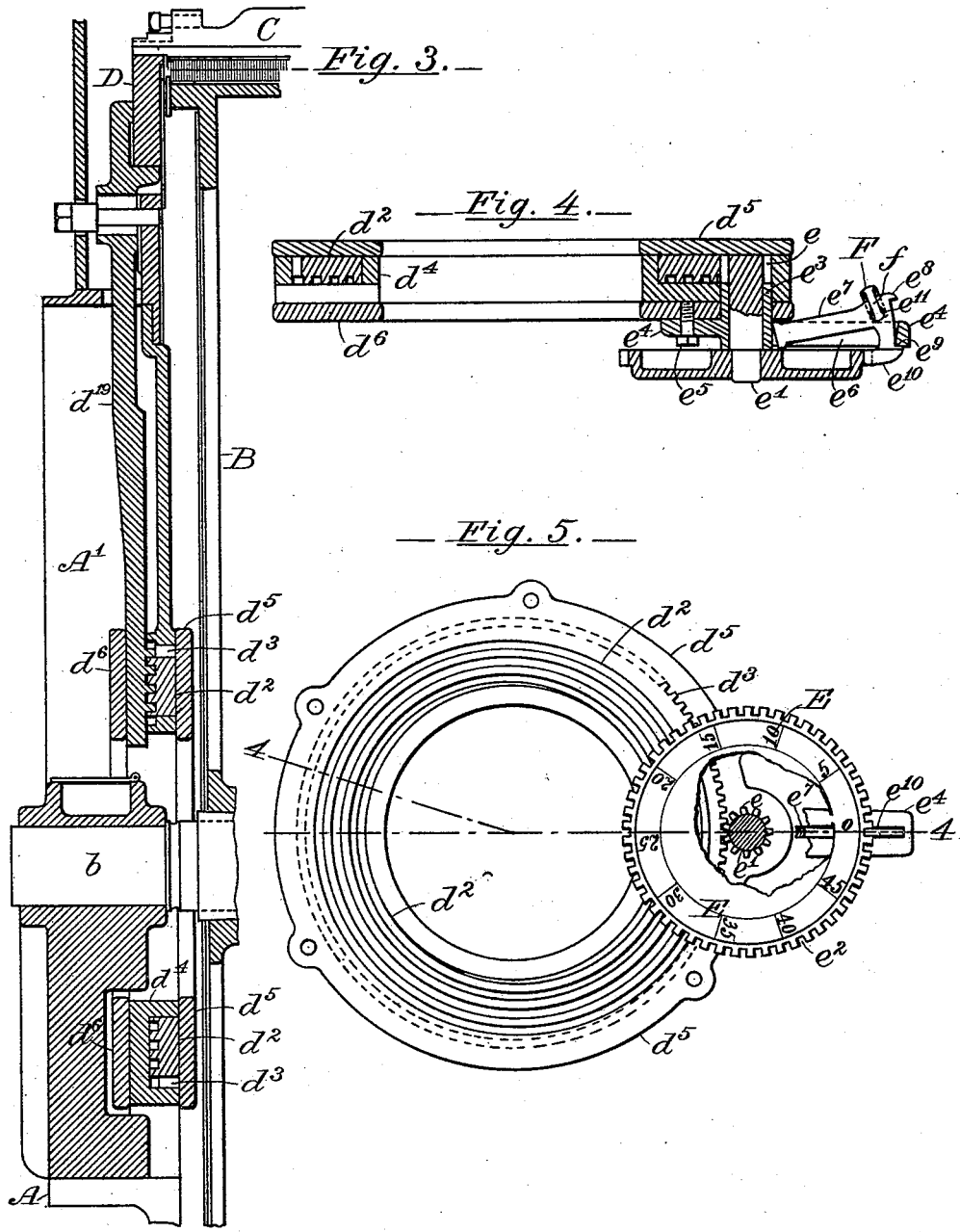

(No Model.) 4 Sheets—Sheet 4.

C. L. HILDRETH.
CARDING ENGINE.

No. 457,319. Patented Aug. 4, 1891.

WITNESSES:
Fred N. Baker
C. N. Childs

INVENTOR:
Chas. L. Hildreth
Channing Whitaker
Attorney.

THE NORRIS PETERS CO., PHOTO-LITHO., WASHINGTON, D. C.

UNITED STATES PATENT OFFICE.

CHARLES L. HILDRETH, OF LOWELL, MASSACHUSETTS, ASSIGNOR TO THE LOWELL MACHINE SHOP, OF SAME PLACE.

CARDING-ENGINE.

SPECIFICATION forming part of Letters Patent No. 457,319, dated August 4, 1891.

Application filed April 2, 1891. Serial No. 387,381. (No model.)

*To all whom it may concern:*

Be it known that I, CHARLES L. HILDRETH, of Lowell, county of Middlesex, State of Massachusetts, have invented certain new and useful Improvements in Carding-Engines having Traveling Top-Flats, of which the following is a specification.

My invention relates to carding-engines having traveling top-flats. In order that the fibers may be properly and uniformly carded in such carding-engines, it is necessary that the distance between the carding-surface of the main cylinder and the carding-surface of each flat at the delivering side thereof should be the same throughout the length of the flat, and that as the teeth of the card-clothing on the flat or cylinder, or both, are ground away the radius and curvature of the flexible bends should be changed, and that thereby the flats should be made to run nearer the cylinder to preserve the proper distance between the carding-surfaces of said flats and cylinder. It is highly desirable that means should be provided by which the necessary adjustment may be made quickly, and that the amount of the adjustment should be equal and known to be equal at each side of the machine by a simple inspection without measurement.

My invention consists in the means, hereinafter described and claimed, of adjusting the flexible bends of traveling-flat carding-engines, of indicating the extent of this adjustment, and of maintaining and locking them in position after adjustment. Ordinarily the top-flats travel upon what are known as "flexible bends," and the relation of the operating-faces of the flats to the curved surface of the main cylinder is determined by change in the position and the curvature of the said flexible bends. Various contrivances have been devised for the purpose of effecting this change. It has been proposed, for instance, to provide a traveling-flat carding-engine with a ring or wheel having peripheral tangential surfaces or steps and to rest on these surfaces or steps the inner ends of the radial arms which sustain the flexible bend, the ring or wheel being rotated, when desired, to permit the radial arms and flexible bend to approach the axis of the main cylinder to the necessary extent. The preferred embodiment of my complete invention is an improvement on this type of adjusting means and involves the principle of construction of the well-known scroll-chuck in use on turning-lathes. In this chuck the jaws are caused to move positively in and out radially by means of a scroll rotatable around the axis of the chuck, and with the convolutions of this scroll projections or portions carried by or connected with the jaws engage. In the said embodiment of my invention I utilize a similar scroll, its convolutions engaging with blocks which are connected with or form part of the radial arms on which the flexible bend is mounted and by which it is held in position on the frame of the carding-engine, and with the scroll I combine the devices hereinafter described, whereby the same may be partially rotated in either direction to the desired extent for the purpose of setting properly the flexible bend, such devices as will be made to appear being provided with means for locking the same in position after adjustment has been effected in order to prevent the parts from being disturbed either accidentally or by unauthorized persons. It is not new to provide devices operating to move positively in and out the radial supports of the flexible bend of a carding-engine, and it has been proposed heretofore to substitute in such devices a scroll in lieu of the other means of adjustment therein employed in connection with the radial supports for operating the same.

In the accompanying drawings on four sheets, Figure 1 is an elevation, with certain portions broken out, of the right side of a carding-engine provided with my improvement; Fig. 2 an elevation, also with certain portions broken out, of the left side of a carding-engine provided with my improvement; Fig. 3, a section on the lines 3 3 in Fig. 2, a part of the shaft of the main cylinder, and a traveling flat being shown therein in elevation; Fig. 4, a section on the line 4 4 in Fig. 5; Fig. 5, a side elevation of the scroll, the notched wheel partly broken away to show the pinion, a part of the slotted plate and the latch, and a vertical section of the shaft of the notched wheel and pinion, showing also in elevation the inner cover of the scroll, the outer cover and frame being omitted; and Figs. 6 to 12, inclusive, are views in side and sectional elevation, showing the application of one part of my present invention to different known types of bend-adjusting devices.

The frame A, including the arches A', the main cylinder B and its shaft $b$, and the top-flats C, the ends of which are connected to each other by endless chains, (indicated in Figs. 1 and 2 by dotted lines at $c$,) said chains traveling on rolls $c'$ and said flats being supported while in proximity to the main cylinder upon flexible bends D, secured at opposite sides of the machine to arms $d\ d'\ d^{19}$, are or may be all of the usual construction and operation, and are used in connection with other appliances, such as are commonly employed in machines for carding cotton and other fibers. Upon the arch of the frame at each side of the machine I mount the scroll $d^2$, the threads of which engage with the corresponding threads on radial arms $d\ d'\ d^{19}$, and provide the said scroll with an annular series of spur-teeth arranged at equal intervals; or, what is the same in effect, I secure to each other or form in one piece with each other said scroll $d^2$ and a spur-gear $d^3$ and provide a pinion $e$, which engages said gear $d^3$ within the scroll case or box $d^4$, and has secured to the same shaft $e'$ with it a wheel E, having notches $e^2$ arranged at equal distances from the center of said wheel E and at equal intervals from each other. Said notches $e^2$ are numbered, preferably, in the same regular succession on each wheel E, or have other distinguishing-marks, as letters of the alphabet, succeeding each other in regular order and in the same order on each wheel E. The said wheels are so arranged with reference to the pinions and scrolls $d^2$ that when the notches on each such wheel lying in the same radial plane bear the same figure or mark the scrolls will occupy the same position relatively to a common starting-point, and the outer curved surfaces of the flexible bends will be at the same distance with each other from the center of the main cylinder.

Each scroll-case $d^4$ consists of a portion of the arch or frame of the machine formed with an annular groove, such groove being located in the arch or frame of the machine concentric with the shaft of the main cylinder, a nearly-annular cover $d^5$ being arranged over the inner face of said scroll, and another nearly-annular outside cover $d^6$ being arranged to close the radial slots $d^7\ d^8$ in the outside of the corresponding arch, which slots open into the annular groove aforesaid, in which slots the arms $d\ d'\ d^{19}$ have their radial movement, said covers $d^5\ d^6$ being held in place by bolts $d^9$, which pass through said covers and through said arch. Each scroll $d^2$ has a running fit in the scroll-case $d^4$, as has also the corresponding pinion $e$, which has a running fit in a hole $d^{10}$ in the same arch, said hole $d^{10}$ being cylindrical, except that it opens into the groove, which receives the scroll sufficiently to allow said pinion to engage the spur-teeth $d^3$ of said scroll. The shaft $e'$, on which the pinion $e$ and notched wheel E are fast, is surrounded by a pipe-box or journal-box $e^3$, extending from said pinion to said notched wheel and fast in or formed in one piece, with a plate $e^4$ secured by a bolt $e^5$ or other convenient means to the outside of the outer cover $d^6$ to retain said pinion and notched wheel E in their proper planes of rotation. The plate $e^4$ extends beyond the periphery of the notched wheel and is slotted radially at $e^6$ from the pipe-box $e^3$ nearly to the end of said plate, and within said slot is arranged a hook-shaped latch $e^7$ of the form shown in Fig. 4, said latch having a sufficient length and thickness to reach from end to end of said slot and loosely fit the same. The extreme inner end of the latch $e^7$ or end next the box $e^3$ is wide enough to fit loosely in the space between the outer cover $d^6$ and the notched wheel E, and said latch between its ends is narrow enough to allow the other or outer end thereof to move freely in the slot $e^6$. The outer end of the latch $e^7$ is provided with two projections $e^8\ e^9$, which extend beyond the outer end of the slot $e^6$ on opposite sides of the plate $e^4$ to limit the movement of said latch and to prevent its removal from said plate when said plate, the outer cover $d^6$, and the notched wheel E are in their proper positions relatively to each other. The outer end of the latch reaches beyond the wheel E and has a hook-shaped dog $e^{10}$, which extends toward the inner end of the body of said latch, and is of a sufficient length to engage and fill any notch of said wheel E, the space between the engaging end of said dog $e^{10}$ and the body of said latch being sufficient to allow said wheel E to turn freely and rotate the scroll when the stop projection $e^8$ is in contact with the inner face of the slotted plate $e^4$, and said dog $e^{10}$ and the stop projection $e^9$ being so situated relatively to each other that when said last-named stop projection is in contact with the outer surface of said slotted plate said dog is in engagement with said notched wheel and prevents the rotation of the same. The turning of wheel E after the latch has been moved so as to carry its dog $e^{10}$ out of engagement with the said wheel may be effected by hand or through the aplication of a suitable tool thereto.

To prevent operatives or unauthorized persons from tampering with the devices which vary the curvature of the flexible bend, the latch $e^7$ is provided with a hole $e^{11}$ to receive the bow $f$ of a padlock F, said bow when said latch is in engagement being in contact with the inner side of said slotted plate and when the padlock is locked preventing any movement of said latch, and therefore any movement of the notched wheel E.

Although I deem the direct engagement of pinion $e$ with wheel $d^3$ to be best, yet, if deemed desirable, the connections between pinion $e$ and gear $d^3$ may be through intermediate gears; or, if desired, a worm and worm-wheel may be introduced between the notched wheel and the wheel connected with the scroll. These changes I consider wholly within the scope of my invention and to be included by the reference to gear connection in certain of the following claims.

The notched wheel, with its latching and locking arrangements, is capable of being applied to other forms of adjusting devices than that shown in Figs. 1 to 5, and hereinbefore described. In Figs. 6 to 12 I have shown the same applied to each of several different known forms of such devices.

Figure 6:
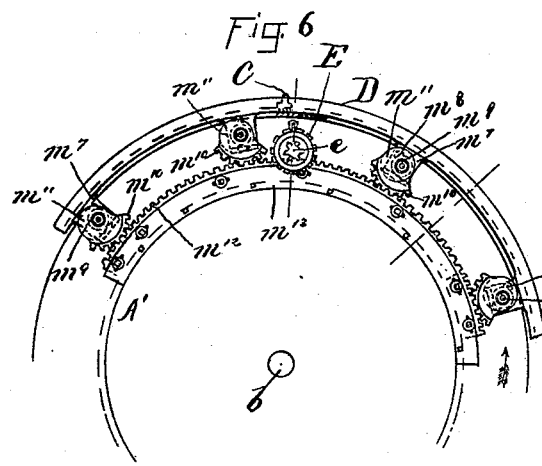
Figure 7:
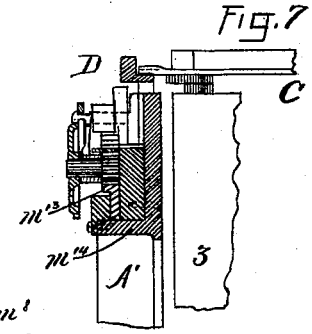
Figure 8:
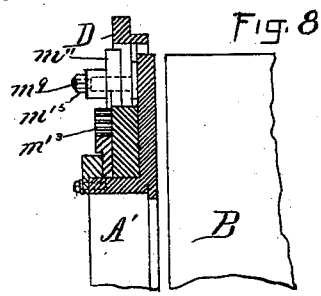

In Figs. 6, 7, and 8 the flexible bend D is provided with feet or brackets $m^7$ on the lower side thereof, these feet or brackets being slotted at $m^8$ and being connected to the arch or main bend of the machine-frame by studs $m^9$, which pass through the slots $m^8$ in the feet or brackets. On each of the studs is mounted a segmental pinion $m^{10}$, the upper or back portion $m^{11}$ of which is formed eccentrically or cam-shaped. The segmental pinions on each frame side or main bend gear into a rack $m^{12}$, formed on or secured to a segmental plate $m^{13}$, concentric with the main cylinder and fitted to slide around on a flange $m^{14}$, formed on the main bend or frame side. The pinion $e$, connected with the notched wheel E, engages the rack $m^{13}$, and the said notched wheel E is provided with an index and latching and locking devices, such as already have been described, these devices being indicated in Figs. 6 and 7. The segmental pinions $m^{10}$ are held in their places on the studs by nuts $m^{15}$ on the said studs, and when it is desired to adjust the flexible bend these nuts are slackened, the pinions being afterward locked in adjusted position by tightening the nuts $m^{15}$.

Figure 10:
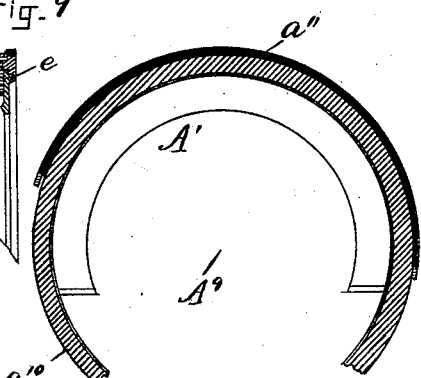

In Figs. 9 and 10 I have shown the application of the notched wheel and its latching and locking devices to a construction in which the main bend or arch A' has its rim turned to a true circle from the center $A^9$, a tapering ring or strip $a^{10}$ being placed on the circumference of this rim, and another strip $a^{11}$ of exactly the same taper, but with its smaller end in the opposite direction, is placed on top of the first ring, this ring $a^{11}$ serving as the flexible bend. The pinion $e$, connected with the notched wheel E, engages with a rack carried by or forming part of the ring $a^{10}$.

Figure 11:
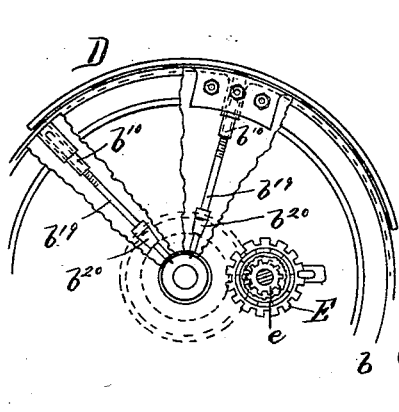
Figure 12:
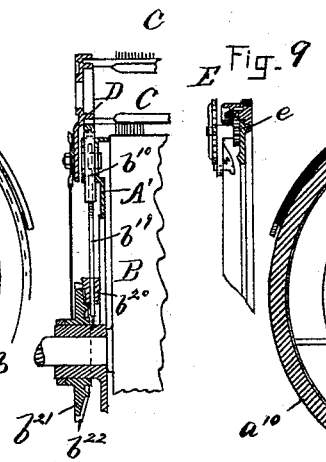

In Figs. 11 and 12 I have shown the application of the notched wheel and its latching and locking devices to a construction in which the flexible bend D is supported on the outer ends of radial pillars or arms $b^{10}$, into which pillars or arms the outer screw-threaded ends of the rods $b^{19}$ take, the said rods $b^{19}$ being provided with bevel-pinions $b^{20}$ in engagement with a large bevel gear-wheel $b^{21}$, having teeth $b^{22}$ engaged by the pinion connected with the notched wheel E.

The latching and locking devices have not been represented in detail in Figs. 6 to 12, but in practice the said devices will be employed in connection with the other parts shown in the said figures.

All the arrangements of flexible bend-adjusting devices so far presented herein are of the class wherein all of the parts of the bend are adjusted simultaneously by equal amounts. I conceive that there is an advantage in providing for this simultaneous adjustment; but my notched wheel, with its index and latching and locking devices, is fitted for and is intended for employment in connection with the arrangements of adjusting devices wherein each part of the flexible bend is adjusted separately.

I claim as my invention—

1. In combination, a flexible bend, a support therefor, a device for adjusting such support, a notched wheel in gear connection with such adjusting device, and a latch adapted to enter any notch of said wheel and to prevent the rotation thereof, substantially as described.

2. In combination, a flexible bend, a support therefor, a device for adjusting such support, a notched wheel in gear connection with such adjusting device, a latch adapted to enter any notch of said wheel and to prevent the rotation thereof, and a lock to hold said latch in engagement with the said notched wheel, substantially as described.

3. The combination of the frame, the flexible bend, means for simultaneously adjusting all the parts of said bend radially by equal amounts, a wheel operating said adjusting means to move said bend definite radial distances by definite rotary movements of said wheel and provided with notches, and a latch adapted to enter any notch of said wheel and to prevent the rotation thereof, as and for the purpose specified.

4. The combination of the frame, the flexible bend, means for simultaneously adjusting all the parts of said bend radially by equal amounts, a wheel operating said adjusting means to move said bend definite radial distances by definite rotary movements of said wheel and provided with notches, a latch adapted to enter any notch of said wheel and to prevent the rotation thereof, and a lock to hold said latch in engagement with said notched wheel, as and for the purpose specified.

5. The combination of the frame, the radial arms, the flexible bend carried by said arms, means for simultaneously adjusting said arms radially by equal amounts, a wheel in gear connection with said adjusting means and provided with notches at equal angular intervals, and a latch adapted to enter any notch of said wheel and to prevent the rotation thereof, as and for the purpose specified.

6. The combination of the frame, the radial arms, the flexible bend carried by said arms, means for simultaneously adjusting said arms radially by equal amounts, a wheel in gear connection with said adjusting means and provided with notches at equal angular intervals, a latch adapted to enter any notch of said wheel and to prevent the rotation thereof, and a lock to hold said latch in engagement with said notched wheel, as and for the purpose specified.

7. The combination of the frame, the radial arms, the flexible bend carried by said arms, the scroll, a wheel in gear connection with said scroll and provided with notches at equal angular intervals, and a latch adapted to enter any notch of said wheel and to prevent the rotation thereof, as and for the purpose specified.

8. The combination of the frame, the radial arms, the flexible bend carried by said arms, the gear, the scroll concentric with said gear and rotating therewith, a pinion engaging said gear, a wheel rotating only with said pinion and provided with notches at equal intervals, and a latch adapted to enter any notch of said wheel and to prevent the rotation thereof, as and for the purpose specified.

9. The combination of the frame, the radial arms, the flexible bend, the gear, the scroll concentric with said gear and rotating therewith, a pinion engaging said gear, a wheel concentric with said pinion and rotating only therewith and provided with notches at equal angular intervals, a latch adapted to enter any notch of said wheel and to prevent the rotation thereof, and a lock to hold said latch in engagement with said notched wheel, as and for the purpose specified.

10. The combination of the notched wheel, a stationary slotted plate adjacent thereto, a latch movable in the slot of said plate and adapted to project through said slot into engagement with the notches of said wheel and also adapted to be disengaged from said notches, and a padlock to be engaged with said latch and retain the same in such engagement, as and for the purpose specified.

11. The combination of a case, a scroll arranged therein and provided with spur-teeth, a pinion engaging said teeth within said case, a wheel rotating only with said pinion and provided with notches, said notched wheel being arranged at an interval from said case, a slotted plate secured to said case, a latch movable in the slot of said plate, one end of said latch being arranged between said case and said notched wheel, and said latch extending from end to end of said slot and having stop projections which extend beyond said slot from the other end of said latch on opposite sides of said plate to limit the motion of said latch in said slot, said latch having also a dog to engage any notch of said notched wheel, and a lock to retain said latch in such engagement, as and for the purpose specified.

In witness whereof I have signed this specification, in the presence of two attesting witnesses, this 1st day of April, A. D. 1891.

CHAS. L. HILDRETH.

Witnesses:
FRED A. BAKER,
C. N. CHILDS.